United States Patent [19]

Irwin

[11] 4,383,105

[45] May 10, 1983

[54] POLYIMIDE-ESTERS AND FILAMENTS

[75] Inventor: Robert S. Irwin, Wilmington, Del.

[73] Assignee: E. I. Du Pont de Nemours and Company, Wilmington, Del.

[21] Appl. No.: 334,891

[22] Filed: Dec. 28, 1981

[51] Int. Cl.³ ............................................. C08G 73/16
[52] U.S. Cl. ................................... 528/170; 528/271; 528/289; 528/322
[58] Field of Search ................ 528/170, 271, 289, 322

[56] References Cited

U.S. PATENT DOCUMENTS

| 3,542,731 | 11/1970 | Culbertson | 528/170 |
|---|---|---|---|
| 4,041,065 | 8/1977 | Lindberg et al. | 528/170 |
| 4,101,488 | 7/1978 | Ishizuka et al. | 528/170 |
| 4,161,470 | 7/1979 | Calundann . | |
| 4,176,223 | 11/1979 | Irwin . | |
| 4,183,839 | 1/1980 | Gagliani et al. | 528/170 |
| 4,206,261 | 6/1980 | Laganis et al. | 528/170 |
| 4,219,461 | 8/1980 | Calundann . | |
| 4,245,086 | 1/1981 | Uno et al. | 528/170 |
| 4,256,624 | 3/1981 | Calundann . | |

FOREIGN PATENT DOCUMENTS 2399453  8/1977  France ................................ 528/170

OTHER PUBLICATIONS

Chemical Abstracts, vol. 83, p. 29, (1975).

Primary Examiner—Lester L. Lee

[57] ABSTRACT

High modulus filaments are melt-spun from polyimide-esters derived from I 6-hydroxy-2-naphthoic acid, a diphenol and 4-carboxy-N-(p-carboxyphenyl)-phthalimide; II 6-hydroxy-2-naphthoic acid, an aromatic dicarboxylic acid 4-hydroxy-N-(p-hydroxyphenyl)phthalimide; or III 6-hydroxy-2-naphthoic acid, 4-hydroxybenzoic acid and 4-carboxy-N-(p-hydroxyphenyl)phthalimide. The polyimide esters are optically anisotropic in the melt. As-spun filaments from these polymers can be heat treated while free from tension to increase their tenacity.

8 Claims, No Drawings

POLYIMIDE-ESTERS AND FILAMENTS

BACKGROUND OF THE INVENTION

1. Field of the Invention

This invention pertains to moldable and melt-spinnable polyimide-esters and to tough high modulus filaments and films thereof.

2. Description of the Prior Art

A class of polyimide-esters that form optically anisotropic melts from which oriented filaments can be melt-spun has been described in Irwin U.S. Pat. No. 4,176,223. These polymers are derived from 2,6-naphthalene dicarboxylic acid and either (a) a substituted hydroquinone and 4-carboxy-N-(p-carboxyphenyl) phthalimide or (b) terephthalic acid and 4-hydroxy-N-(p-hydroxyphenyl)phthalimide. Filaments that are melt-spun from such polymers can be heat treated to develop high tenacity and modulus.

A melt processable aromatic polyester that forms an anisotropic melt and is derived from a para-oriented dihydric phenol, a para-oriented aromatic dicarboxylic acid and 6-hydroxy-2-naphthoic acid is disclosed in Calundann U.S. Pat. No. 4,256,624. Polyesters formed from combinations of para-hydroxybenzoic acid and 6-hydroxy-2-naphthoic acid are disclosed in Calundann U.S. Pat. Nos. 4,161,470 and 4,219,461.

The present invention provides a new class of anisotropic-melt-forming polymers which can be melt cast into films or melt-spun into filaments which can be heat treated to provide products of high tenacity and modulus. The heat-treated products have unusual toughness compared to prior art products prepared from anisotropic melt polymers.

SUMMARY OF THE INVENTION

The present invention is directed to fiber-forming polyimide-esters selected from combination I, II or III, each consisting essentially of units having structural formulas as follows:

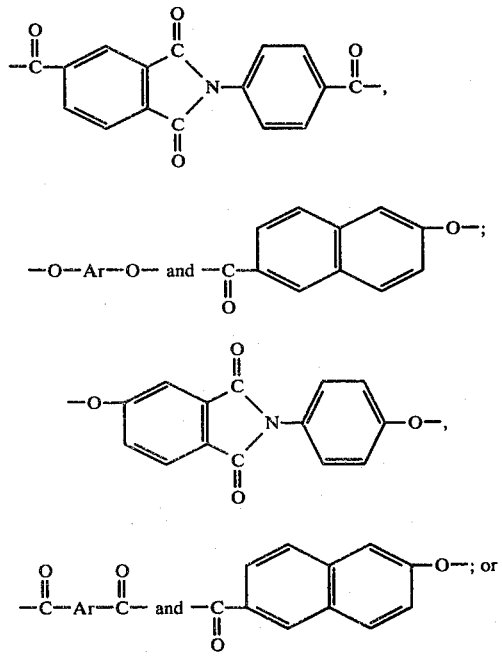

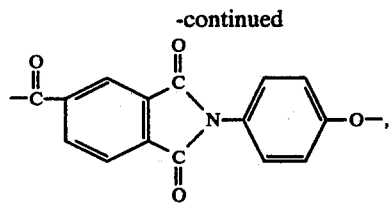

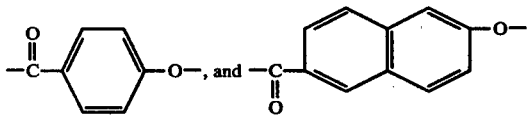

such that unit

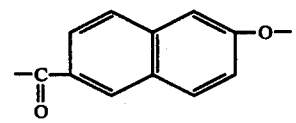

in I and II is present in an amount of from 10 to 30 mole percent, the dioxy units and dicarbonyl units being present in substantially equimolar amounts and wherein Ar represents m- and p-phenylene and substituted m- and p- phenylene; and such that unit

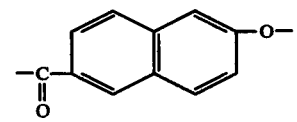

in III is present in an amount of from 40 to 60 mole percent, the other units each being present in an amount of from 20 to 30 mole percent.

DETAILED DESCRIPTION OF THE INVENTION

In the following discussion directions are given for selecting the precursors of each of the required structural units. It should be understood that the precursors may be used in equivalent forms. For example the dihydric phenols may be used in the form of the diacetates. Dicarboxy acids may be used as the dimethyl or diphenyl esters. The hydroxy carboxyl aromatics may be used as the acetoxy aromatic carboxylic acids.

One group of polyimide-esters of the present invention (combination I) consists essentially of 6-oxy-2-carbonylnaphthalene, i.e.

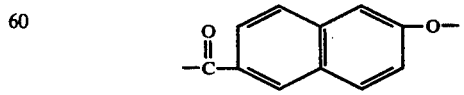

units which may be derived from 6-hydroxy-2-naphthoic acid; -O-Ar-O-units, which can be derived from substituted or unsubstituted hydroquinone; and 4-carbonyl-N-(p-carbonylphenylene)phthalimide units), i.e.

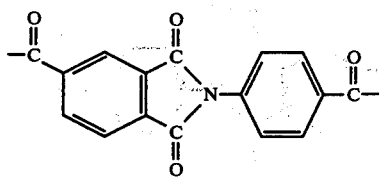

which can be derived from 4-carboxy-N-(p-carboxyphenyl)-phthalimide (hereinafter referred to as TB).

Another group of polyimide-esters of this invention (combination II) consists essentially of 6-oxy-2-carbonylnaphthalene units;

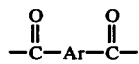

units, which may be derived from terephthalic acid or substituted derivatives thereof; and 4-oxy-N-(p-oxyphenylene)phthalimide units, i.e.

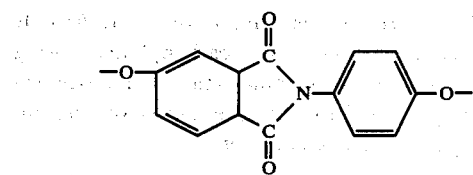

which may be derived from 4-hydroxy-N-(p-hydroxyphenyl)phthalimide (hereinafter referred to as TBG).

Still another group of polyimide-esters of this invention (combination III) consists essentially of 6-oxy-2-carbonylnaphthalene units; 4-oxybenzoyl units, i.e.,

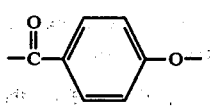

which may be derived from 4-hydroxybenzoic acid; and 4-carbonyl-N-(p-oxyphenylene)phthalimide units, i.e.,

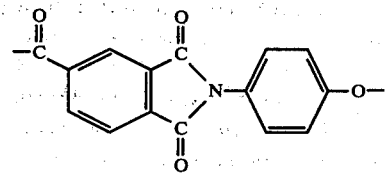

which may be derived from 4-carboxy-N-(p-hydroxyphenyl)phthalimide (hereinafter referred to as TBE).

In combination I, the -O-Ar-O- unit may be provided by p-hydroquinone, resorcinol, chlorohydroquinone, methyl-hydroquinone, phenyl-hydroquinone, and other meta or para-dihydric phenols. In combination II, the

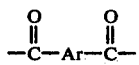

unit may be provided by terephthalic acid, isophthalic acid, and other meta or para-aromatic dicarboxylic acids, including 2,6-naphthalene dicarboxylic acid.

It should be understood that the -O-Ar-O-units and/or the

units may be provided by more than one dihydric phenol and/or aromatic dicarboxylic acid. In combination III small amounts, up to 10 mole %, of other hydroxy aromatic carboxylic acids may be used. In any case the total units derived from dihydric phenols should be equivalent to the total units derived from aromatic dicarboxylic acids.

The polyimide-esters of the invention are capable of forming optically anisotropic melts as defined in Schaefgen U.S. Pat. No. 4,118,372 and have a molecular weight sufficient for melt-spinning into filaments.

POLYMERIZATION CONDITIONS

The polyimide-esters of the invention may be prepared by standard melt polymerization techniques from the reactant precursors in such proportions that the moles of dihydric phenolic reactant(s) are substantially equal to the moles of aromatic dicarboxylic acid reactant described above. Details of the procedure are found in the examples below. In general, polymerization conditions such as temperature, duration of heating, pressures, etc., may be varied depending on the reactants employed and the degree of polymerization desired. Normally an inherent viscosity $\eta_{inh}$ of at least 0.4 measured as described below is adequate for filament formation.

FILAMENT PREPARATION

The polyimide-esters may be spun into filaments by conventional melt-spinning techniques. A melt of the polymer is extruded through a spinneret into a quenching atmosphere (e.g., air or nitrogen maintained at room temperature) and wound up.

As used herein, the term "as-spun" filament refers to a filament which has not been drawn or heat-treated after extrusion and normal windup. The as-spun and heat-treated filaments of the invention have exceptional moduli.

HEAT TREATMENT AND UTILITY

The as-spun filaments of this invention may be subjected to heat treatment in an oven while relaxed to provide high strength filaments useful for a variety of industrial applications such as for reinforcement of plastics and rubber. In the heat treating process, loosely collected filament (on soft yielding bobbins, as skeins, as piddled packages, etc.) are usually heated in an inert atmosphere that is continuously purged by flow of inert gas through the oven to remove by-products from the vicinity of the filament. Temperatures approaching the fusion point but sufficiently below to prevent interfilament fusion are employed. Preferably the maximum temperature is reached in a stepwise fashion. Further details are given in Luise U.S. Pat. No. 4,183,895. The heat-treated filaments of the invention have high tenacity, high modulus and high toughness.

Test Methods

Inherent viscosity ($\eta_{inh}$) was computed from $\eta_{inh} = \ln(\eta_{rel})/C$ wherein ($\eta_{rel}$) is the relative viscosity and C is a solution concentration in grams of polymer per deciliter of solvent. Relative viscosity is the ratio of polymer solution flow time to solvent flow time in a capillary viscometer at 30° C.

The polymers were characterized by "stick temperature" meaning the temperature of a thermal-gradient hot bar at the point at which the polymer first began to stick as it was pressed to the bar at progressively higher temperatures.

Monofilament tensile properties were measured using a recording stress-strain analyzer at 70° F. (21.1° C.) and 65% relative humidity. Gauge length was 1.0 in (2.54 cm), and rate of elongation was 10%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Average tensile properties for three to five filament samples are reported.

Toughness is reported as the integrated area under the stress-strain curve and is expressed in dN/tex (deci-Newtons per tex).

EXAMPLES

The same general procedure was used in all the examples. It should be understood that the results reported below are believed to be representative and do not constitute all the runs involving the indicated reactants.

In the examples, the diacetate of the dihydric phenols and the monoacetates of the hydroxyaromatic acids were used. The aromatic dicarboxylic acids were used as such rather than as esters or other derivatives.

Chem. Abs. p. 29 vol. 83 (1975) presents summary of Japanese patent application publication 74/44,957 and discloses preparation of 4-carboxy-N-(p-hydroxyphenyl)phthalimide.

The monomer ingredients were added in substantially the same molar ratios as desired in the final polymer except that an excess (usually up to 7%) of acetylated dihydric phenol was generally used. The resultant polymer is identified, for exampled, as CHQ/TB/HNA (41.2/41.2/17.7) meaning that chlorohydroquinone (CHQ), 4-carboxy-N-(p-carboxyphenyl)phthalimide(TB) and 6-hydroxy-2-naphthoic acid (HNA) were added in sufficient quantitites to give 41.2 mole %, 41.2 mole %, and 17.7 mole % of the corresponding structural units in the finished polymer.

A 3-necked flash or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then, vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLE 1

POLYESTER FROM CHLOROHYDROQUINONE (CHQ) DIACETATE, 4-CARBOXY-N-(p-CARBOXYPHENYL)PHTHALIMIDE(TB), AND 6-HYDROXY-2-NAPHTHOIC ACID (HNA) MONOACETATE

A polymer with the composition CHQ/TB/HNA (41.2/41.2/17.7) was prepared from a mixture containing 9.88 g CHQ diacetate (0.0433 mole including 5% excess)

12.81 g TB (0.0412 mole)

4.06 g HNA monoacetate (0.0177 mole)

The temperature was raised from 200° C. to 355° C. in 45 minutes at atmospheric pressure under nitrogen; then was held at 355° C. for 3 minutes at a pressure of 0.5 mm Hg. The resulting polymer on the thermal gradient hot bar softened at 310° C. and at 340° C. fibers could be pulled from the bar. The polymer was insoluble in hot p-chlorophenol. In the thermooptical test of Schaefgen U.S. Pat. No. 4,118,372 the polymer was optically anisotropic in the melt and flowed at 274° C.

The polymer was melt-spun through a single spinneret hole of 0.23 mm diameter with a spinneret temperature of 359° C., a cell temperature of 353° C. and a wind-up speed of 364 meters/min. The monofilament yarn was heat-treated in a nitrogen-purged atmosphere in an essentially relaxed condition for 2 hours at 190° C., 4 hours at 190°-297° C., and 16 hours at 297° C. The following tensile properties were obtained for the as-spun and heat-treated filaments.

|  | Tex | T | E | MI | Toughness |
|---|---|---|---|---|---|
| As-Spun | 1.01 | 5.4 | 1.5 | 406 | 0.045 |
| Heat-Treated | 1.15 | 13.2 | 4.1 | 375 | 0.293 |

EXAMPLE 2

POLYESTER FROM 4-HYDROXY-N-(p-HYDROXYPHENYL)-PHTHALIMIDE (TBG) DIACETATE, TEREPHTHALIC ACID (T), AND 6-HYDROXY-2-NAPHTHOIC ACID (HNA) MONOACETATE

A polymer with the composition TBG/T/HNA (41.2/41.2/17.7) was prepared by mixing the following in the polymerization vessel:

11.40 g TBG diacetate (0.0336 moles including 1.8% excess)

5.47 g T (0.0330 moles)

3.25 g HNA monoacetate (0.0140 mole)

The mixture was heated in the polymerization vessel from 190° C. to 350° C. in 35 minutes at atmospheric pressure under nitrogen purge, then at 350° C. for 4 minutes under vacuum at a pressure of 20 mm Hg, and finally at 350° C. for 13 minutes at 0.4 mm HG. The resulting polymer softened on the thermal gradient bar at 280° C. and fibers could be pulled from the bar at 300° C. The inherent viscosity in p-chlorophenol was 1.98. The polymer formed an optically anisotropic melt.

The polymer was melt-spun through a single hole spinneret with 0.23 mm hole diameter with the spinneret temperature at 337° C., the spinning cell at 333° C., and the wind-up speed 546 meters/min. The filament was heat-treated in a nitrogen purge as in Example 1. Tensile properties were as follows:

|  | Tex | T | E | MI | Toughness |
|---|---|---|---|---|---|
| As-Spun | 0.47 | 4.5 | 1.5 | 345 | 0.037 |
| Heat-Treated | 0.61 | 12.9 | 4.4 | 404 | 0.315 |

EXAMPLE 3

POLYESTER FROM 6-HYDROXY-2-NAPHTHOIC ACID (HNA) MONOACETATE, 4-HYDROXY BENZOIC ACID (HBA) MONOACETATE, AND 4-CARBOXY-N-(p-HYDROXYPHENYL)-PHTHALIMIDE (TBE) MONOACETATE

A polymer having the composition HNA/HBA/TBE (50/25/25) was prepared from a mixture having the following composition:
  9.20 g HNA monoacetate (0.040 mole)
  3.60 g HBA monoacetate (0.020 mole)
  6.50 g TBE monoacetate (0.020 mole)
The mixture was heated in a reaction vessel under nitrogen from 200° to 355° C. in 35 minutes at atmospheric pressure, then heated at 355°–360° C. for 4 minutes while reducing pressure to 0.1 mm Hg. The resulting polymer softened on the thermal gradient bar at 315° C., and fibers could be pulled at 335° C. It formed an anisotropic melt in the thermooptical test.

The polymer was spun through a one-hole spinneret (orifice diameter 0.23 mm) with a spinneret temperature of 360° C., a cell temperature of 355° C. and a wind-up speed of 319 meters/min.

The resulting filament was heat-treated as in Example 1. Tensile properties were as follows:

|  | Tex | T | E | MI | Toughness |
|---|---|---|---|---|---|
| As-Spun | 1.09 | 4.9 | 1.6 | 370 | 0.043 |
| Heat-Treated | 1.08 | 11.0 | 3.6 | 376 | 0.214 |

I claim:

1. A melt-spinnable polyimide-ester capable of forming an optically anisotropic melt consisting essentially of units having structural formulas as follows:

I.

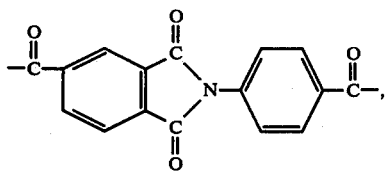

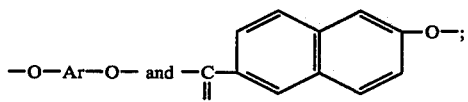

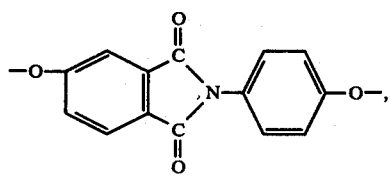

-continued

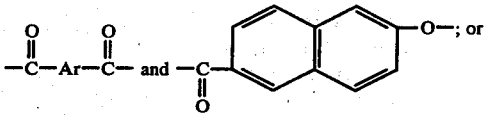

III.

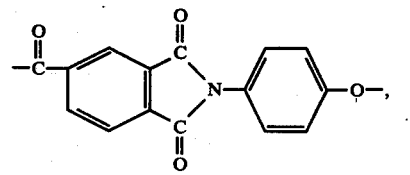

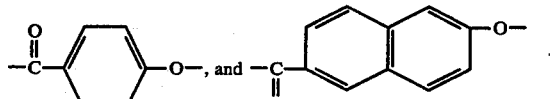

such that in I and II, unit

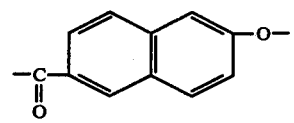

is present in an amount of from 10 to 30 mole percent, and the dioxy units and dicarbonyl units are present in substantially equimolar amounts with Ar in I being chloro- or methyl-p-phenylene, and Ar in II being p-phenylene; and such that in III, unit

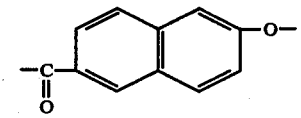

is present in an amount of from 40 to 60 mole percent, with each of the other units being present in an amount of from 20 to 30 mole percent.

2. A melt-spinnable polyimide-ester capable of forming an optically anisotropic melt consisting essentially of units having structural formulas as follows:

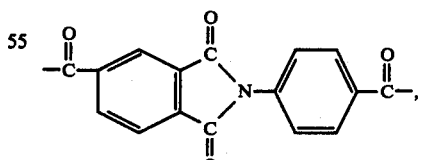

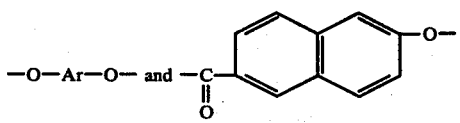

such that

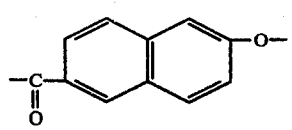

is present in an amount of from 10 to 30 mole percent, the dioxy units and dicarbonyl units are present in substantially equimolar amounts and Ar is chloro-p-phenylene.

3. A melt-spinnable polyimide-ester capable of forming an optically anisotropic melt consisting essentially of units having structural formulas as follows:

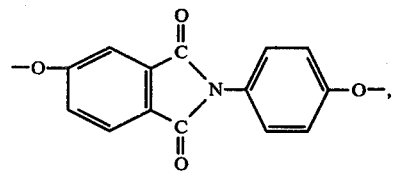

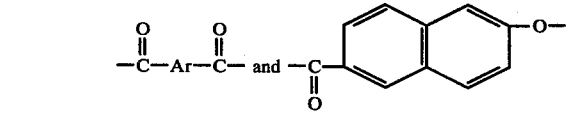

such that

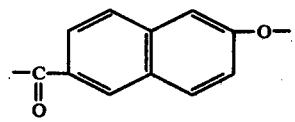

is present in an amount of from 10 to 30 mole percent, the dioxy units and dicarbonyl units are present in substantially equimolar amounts and Ar is p-phenylene.

4. A filament of the polyester-imide of claim 1.
5. A filament of the polyester-imide of claim 2.
6. A melt-spinnale polyimide-ester capable of forming an optically anisotropic melt consisting essentially of units having structural formulas as follows:

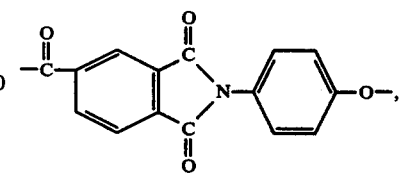

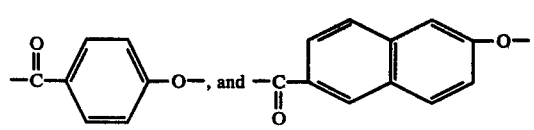

such that

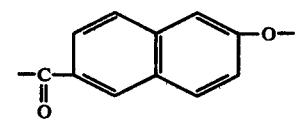

is present in an amount of from 40 to 60 mole percent, the other units each being present in an amount of from 20 to 30 mole percent.

7. A filament of the polyester-imide of claim 3.
8. A filament of the polyester-imide of claim 6.

* * * * *